United States Patent [19]

Mahajan et al.

[11] Patent Number: 5,649,027
[45] Date of Patent: Jul. 15, 1997

[54] RECOGNITION OF HANDWRITTEN WORDS

[75] Inventors: Milind Vasudeo Mahajan; Shishir Pardikar, both of Redmond, Wash.

[73] Assignee: Microsoft Corporation, Redmond, Wash.

[21] Appl. No.: 252,056

[22] Filed: May 31, 1994

Related U.S. Application Data

[63] Continuation of Ser. No. 919,218, Jul. 24, 1992, abandoned.
[51] Int. Cl.⁶ .................... G06K 9/18; G06K 9/00
[52] U.S. Cl. ............ 382/185; 382/186; 382/218; 382/229
[58] Field of Search ................ 382/185, 186, 382/189, 218, 219, 229

[56] References Cited

U.S. PATENT DOCUMENTS

| | | | |
|---|---|---|---|
| 4,573,196 | 2/1986 | Crane et al. | 382/185 |
| 4,718,102 | 1/1988 | Crane et al. | 382/185 |
| 5,020,117 | 5/1991 | Ooi et al. | 382/46 |
| 5,022,081 | 6/1991 | Hirose et al. | 381/43 |
| 5,151,950 | 9/1992 | Hullender | 382/13 |
| 5,191,622 | 3/1993 | Shojima et al. | 382/13 |
| 5,255,189 | 10/1993 | Woo | 364/419.19 |

*Primary Examiner*—Jose L. Couso
*Assistant Examiner*—Matthew C. Bella
*Attorney, Agent, or Firm*—Seed and Berry LLP

[57] ABSTRACT

A method and system of recognizing words from handwritten symbols that are recognized by a computer recognizer. The recognizer produces a set of one or more alternatives for each symbol and orders the alternatives within each set in terms of the probability that each alternative matches the handwritten symbol for the set. A sequence of strings, each string having one alternative from each set, is enumerated. The enumerating proceeds in order such that the most probable alternatives from each set are used before the lower probability alternatives. Preferably, each string enumerated is looked up in a computer dictionary before enumerating other strings. If the string is found in the dictionary, the string is displayed, and preferably further enumerating stops. In an alternative embodiment, plural strings are enumerated before looking up a string in the dictionary. In another embodiment, plural strings are displayed before stopping further enumeration. Amended symbols may be used to change individual characters within a previously recognized word. A set of alternatives for each amended symbol is coupled with the unchanged symbols before enumerating strings and looking the strings up in a dictionary.

34 Claims, 3 Drawing Sheets

RECOGNITION OF HANDWRITTEN WORDS

CROSS-REFERENCE TO RELATED APPLICATION

This application is a continuation of U.S. patent application Ser. No. 07/919,218, filed Jul. 24, 1992, now abandoned.

TECHNICAL FIELD

This invention is related to a method and apparatus for handwriting recognition, and more particularly, to the recognition of handwritten words using a computer dictionary.

BACKGROUND OF THE INVENTION

Handwriting recognition systems allow users to input handwritten data into a computer. The user writes data on an electronic tablet with a special pen, and as the user moves the pen across the tablet, the tablet displays to the user lines which in appearance are much like handwritten lines on a paper tablet. A computer program handwriting recognizer, given data as a set of strokes, attempts to recognize the set of strokes as characters in an alphabet. The recognizer recognizes by comparing the set of strokes forming a symbol with stored character models.

Very often, because of the great variation in the way people write, the recognizer is not able to decide unambiguously the character a particular set of strokes was intended to denote. For example, if a user writes the word "cat," the recognizer may be able to deduce that there are three symbols written but may not be able to unambiguously recognize all of them. It may, for example, think that the middle symbol is either the letter "a" or "u." To convey this ambiguity, the recognizer produces a set of one or more alternatives for each symbol. The alternatives are arranged within a set from an alternative having the highest probability of corresponding to the written symbol to an alternative having the lowest probability of corresponding to the written symbol. The recognizer determines the relative probability based on how closely the set of strokes forming the symbol approximate the stored character models. Typically, each alternative is a single character but multiple character combinations are also possible. For example, if the symbols "c" and "l" are written too closely together they approximate the character "d." Therefore, the recognizer may produce one alternative being the character "d" and another alternative being a combination of the characters "c" and "l."

Once the recognizer produces a set of alternatives for each written symbol, some processing must be performed to determine which alternative from each set should be used to form a word. One processing method enumerates strings of different combinations of the alternatives and looks up each string in a dictionary.

Various methods could be used to enumerate strings. Enumeration may proceed by producing every possible combination of alternatives in random order. While this method may be accurate to determine the string that the user intended, it is very time-consuming to process, since an attempt must be made to find in the dictionary corresponding words for each string. The recognizer may produce 5–10 alternatives for each symbol. For longer words, literally millions of possible strings may be enumerated. Multiplying the time it takes to enumerate each string by the time it takes to look up each string in the dictionary results in unacceptably long processing times.

SUMMARY OF THE INVENTION

A method and system of recognizing words from handwritten symbols using a computer recognizer and a computer dictionary. The recognizer produces a set of one or more alternatives for each symbol in a word, each alternative having a probability of corresponding to the symbol. The invention automatically enumerates a sequence of strings, each string having one alternative from each set. The enumerating proceeds in the order such that A varies from 0 to Y, where Y is the number of sets produced for the word, and A is the number of sets contributing an alternative that is not the highest probability alternative of its set. Each string enumerated is looked up in a dictionary. When the number of strings found in the dictionary is equal to a preselected wordnumber value, further enumerating stops. The strings found in the dictionary are displayed. Preferably the wordnumber value is one.

A preferred embodiment includes enumerating all combinations of alternatives having greater than or equal to the Mth highest probabilities in each set before enumerating any combinations of alternatives having less than the Mth highest probabilities in each set, where M is a predetermined maximum index valve less than the greatest number of alternatives in any set. The preferred embodiment allows a user to change a previously recognized symbol of a word by writing an amending symbol. The recognizer produces a set of alternatives and the set is grouped with unchanged previously recognized symbols of the word. A sequence of strings is enumerated and each string is looked up in the dictionary.

DETAILED DESCRIPTION OF THE INVENTION

Figure 1:
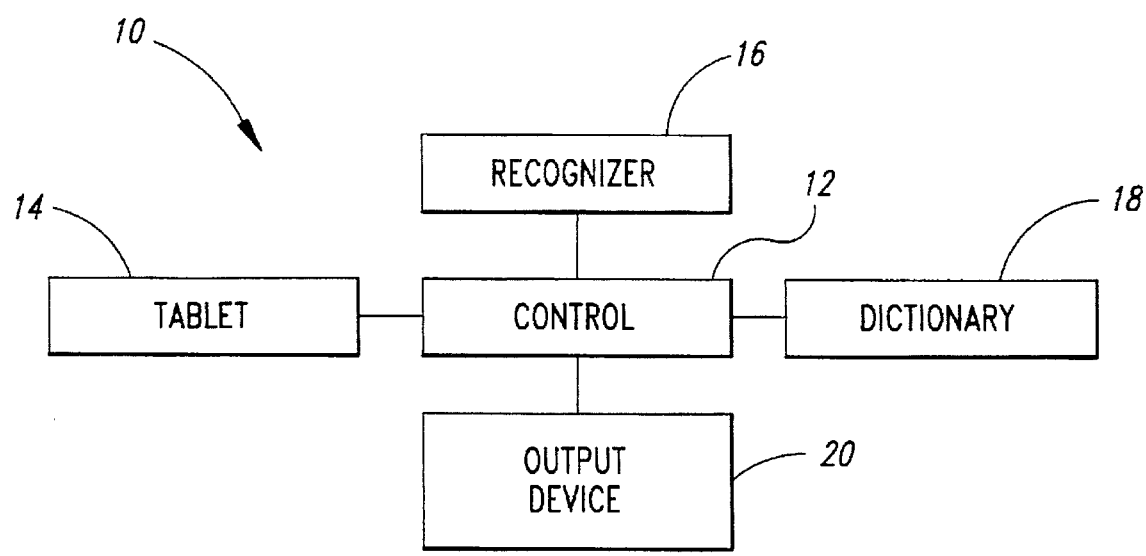
FIG. 1 shows a block diagram of a handwriting recognition system according to the present invention.

FIG. 1 shows a handwriting recognition system 10 having a computer control 12. A user inputs data into a digitizing tablet 14 using an electronic pen (not shown) which operates much like a mouse when moved across the digitizing tablet. The data are sets of pen strokes forming handwritten symbols such as letters and numbers. The digitizing tablet 14 sends the symbols to the control 12, which passes the symbols to a handwriting recognizer 16.

The recognizer 16 is a conventional device that attempts to recognize the symbols by comparing them to stored character models. The recognizer outputs to the control 12 a set of one or more alternatives for each symbol. The control enumerates one or more strings comprising a single alternative from each set. The control looks up selected ones of the strings in a computer dictionary 18. Strings that match words in the dictionary are displayed on an output device 20 for viewing by the user. The output device may be any device that displays characters, such as a conventional computer monitor or printer, or even the tablet 14.

A convenient way to represent groups of sets is by using symbol graphs. As an example, if a user writes the word "cat," the recognizer may be unsure of the first two letters, so returns the symbol graph {c|e}{a|u}t. Each of the bracket characters { } encloses a set, while each line character | separates the alternatives within the set. The {c|e} indicates that the recognizer believes the first symbol is either a "c" or an "e." Since the recognizer returns only a single alternative in the set for the "t" symbol written by the user, the characters "{," "|," and "}" are unnecessary.

The enumeration scheme of the present invention takes advantage of the ability of the recognizer 16 to assign relative probabilities to each alternative. The recognizer determines a probability for each alternative indicating how likely the alternative corresponds to the symbol and orders the alternatives within each set according to the assigned probability. The enumeration scheme enumerates strings with alternatives having higher probabilities before enumerating strings with alternatives having lower probabilities.

The enumeration scheme may best be understood using an example. Supposing the user wrote the word "tone" and the recognizer 16 returns the symbol graph:

{1|Y|7|t}{O|o|u}n{e|u|a|5}.

The symbol graph contains a set of alternatives for each of the handwritten symbols "t," "o," "n," and "e." The set of alternatives corresponding to the symbol "n" contains only a single alternative "n." The alternatives in each set are ordered from left to right in descending order of probability. With respect to the set associated with the symbol "t," the recognizer determined that the alternative "1" most closely matched the symbol "t" while the alternative "t" least closely matched the symbol "t." To simplify matters, the alternatives of each set may be numbered from 1 to X, where the number 1 alternative is the most probable alternative and the number X alternative is the least probable alternative.

Figure 2:
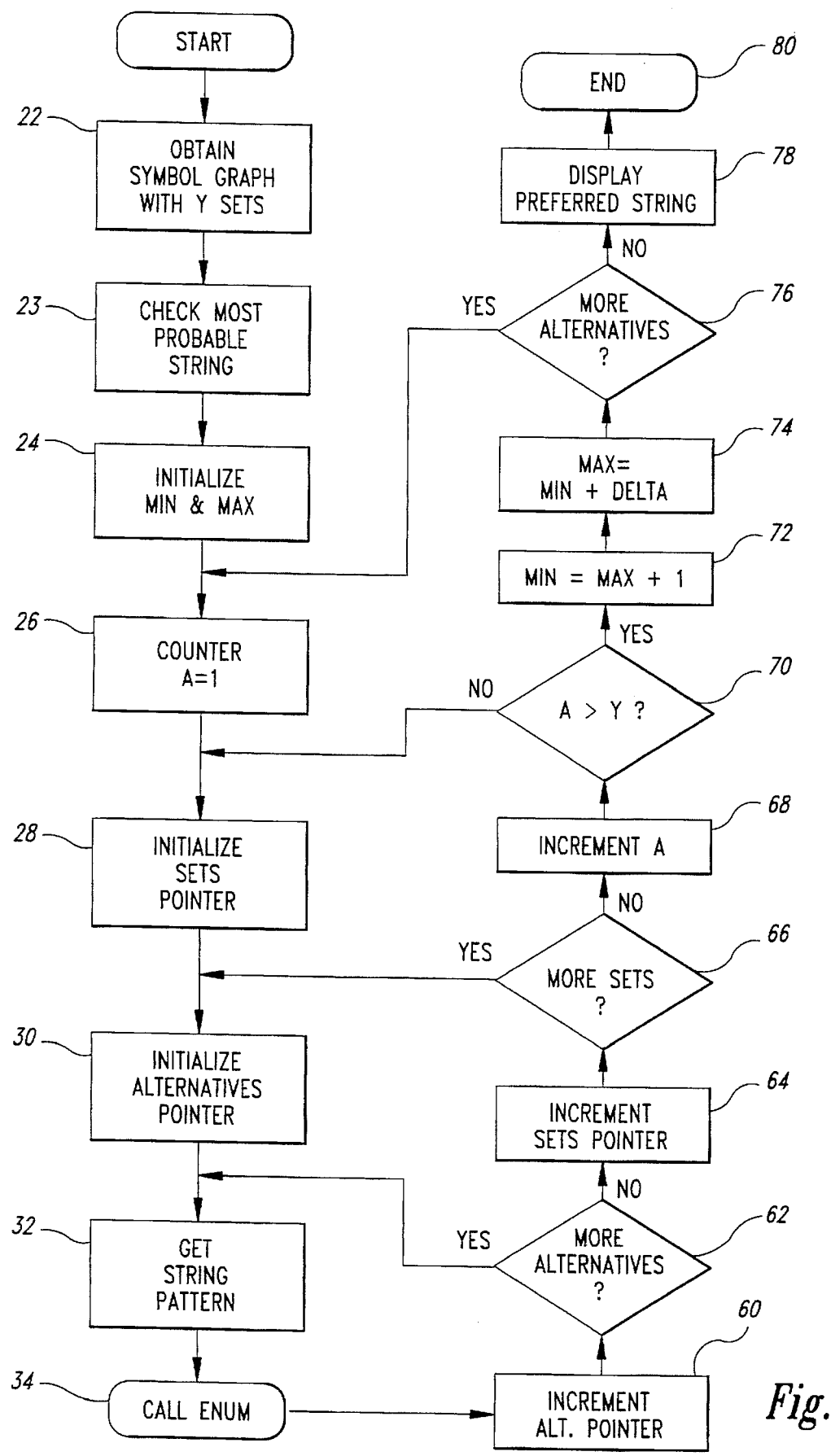
FIG. 2 is a flow diagram of a main portion of an enumeration scheme according to the present invention.
Figure 3:
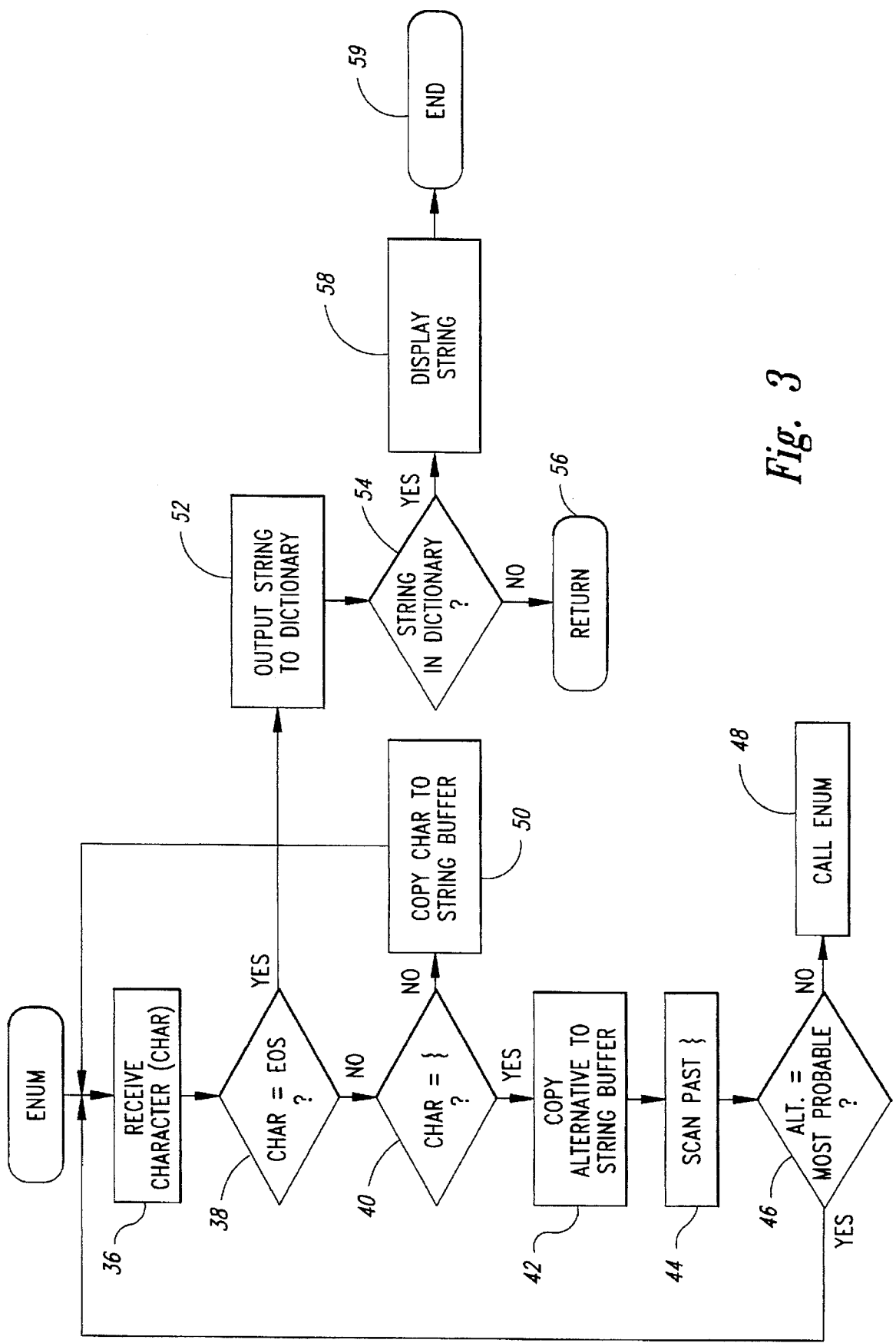
FIG. 3 is a flow diagram of an enumeration subroutine according to the present invention.

FIGS. 2 and 3 are flow diagrams of the enumeration scheme of the present invention. As shown in FIG. 2, a first step 22 in the enumeration scheme obtains the symbol graph from the recognizer 16. A variable Y is assigned the number of sets having more than one variable. In the present example, the symbol graph has four sets, but only three sets have more than one alternative, so Y=3.

In step 23, a single string is enumerated with only the number 1 alternative of each set in the string. In the present example, that string is "1One." In another embodiment, that string is the first string enumerated because it has the highest probability of corresponding to the word written by the user. The string "1One" is looked up in the dictionary 18. If "1One" is in the dictionary, it is displayed to the user on the output device 20 and the enumeration stops. If not, the enumeration scheme continues at step 24.

Step 24 of the scheme initializes minimum (MIN) and maximum (MAX) index values. These index values are used to ensure that only a limited number of alternatives in each group are considered at a time. The alternatives greater than or equal to MIN and less than or equal to MAX are considered before considering less probable alternatives. In the present example, MIN is set to 2 and MAX is set to 3.

In step 26 a counter A is set to 1. The value of counter A corresponds to the number of non-number 1 alternatives to be included in each string. Counter A also keeps track of the point at which the scheme is completed for the current MIN and MAX values.

In step 28 a sets pointer is initialized. The sets pointer keeps track of from which set or sets of the symbol graph an alternative will be taken that is not a number 1 alternative. Since counter A=1, only one non-number 1 alternative per enumeration is considered. In the present example, the sets pointer is initialized to X11. The X signifies from which set the non-number 1 alternative will be taken. Each 1 signifies the number 1 alternative of a set. As discussed below, the sets pointer is incremented to 1X1 and 11X for succeeding enumerations.

In step 30 an alternatives pointer is initialized. The alternatives pointer keeps track of which alternative within each set is the current alternative. Since MIN=2, the alternatives pointer is initialized to point to the number 2 alternative. As discussed below, the alternatives pointer is incremented to 3 for the next enumeration.

In step 32 a string pattern for enumeration is obtained by substituting the alternative pointed to by the alternatives pointer for the X in the sets pointer. Since the sets and alternatives pointers are currently in their initial state, the string pattern is 211. In step 34 the scheme calls a subroutine ENUM which enumerates a string based on the string pattern 211.

The ENUM subroutine is shown in FIG. 3 and starts by receiving a character of the symbol graph in step 36. In step 38 a check is made for an end-of-string (EOS) character to determine whether there are more characters to enumerate. The EOS character signifies a space between written words or any character that is not part of the recognizer alphabet. Since enumeration is just beginning the routine moves to step 40 where a check is made for a "{" character which signifies the beginning of a set containing plural alternatives. In the present example the first character is a "{" so the routine goes to step 42 where the appropriate alternative is copied to a string buffer comprising a block of memory of the control 12. Since a 2 is in the first position of the string pattern the second alternative in the set is copied. That alternative is a "Y."

Step 44 scans past the "}" character to prepare for the next alternative to be enumerated. In step 46 a check is made to determine whether the alternative most recently copied is a number 1 alternative. If it was a number 1 alternative, then the program loops back to step 36. Otherwise, execution passes to step 48 which makes a recursive call to the ENUM subroutine. The difference between looping back and calling ENUM is that a call saves the current value of the alternatives pointer. This allows the control 12 to increment the alternatives pointer for the next string enumeration as discussed below. Since the alternatives pointer points to non-number 1 alternatives, there is no need for a recursive call when the alternative most recently copied was a number 1 alternative. In either case, the ENUM subroutine then repeats steps 36–44 to enumerate the appropriate alternative in the second set. The "1" in the second position of the string pattern mandates that the first alternative "O" in the second set is copied to the string buffer.

After scanning past the "}," the subroutine returns to step 36 to receive the next character after performing the test of step 46. Since the next character in the symbol graph is "n" the result of the checks in steps 38 and 40 is move to step 50. In step 50 the "n" is copied to the string buffer, after which the subroutine returns to step 40 for the next character.

The subroutine repeats steps 36–46 to enumerate the appropriate alternative in the next set. The "1" in the third position of the string pattern mandates that the first alternative "e" in the fourth set is copied to the string buffer. After the "e" is copied the string buffer contains the string "YOne."

Since there are no more alternatives to be enumerated the next character is an EOS character. Therefore, the result of the check in step 38 moves execution of the subroutine to step 52 which looks up the string "YOne" in the dictionary 18. In step 54 a check is made to determine whether the dictionary 18 found the string. If the string is found in the dictionary 18, step 58 displays the string on the output device 10 and step 59 stops the enumeration.

Assuming that the string "YOne" is not in the dictionary 18, execution goes to step 60 in FIG. 2. In step 60 the alternatives pointer is incremented so that it points to the next alternative. In step 62 a check is made to determine whether the next alternative equals the MAX index. Since the next alternative is number 3 and MAX=3, execution passes to step 32.

For the present example, execution proceeds through steps 32–34 and subroutine ENUM to enumerate and look up in the dictionary string "70ne."Assuming that string is not found in the dictionary, execution returns to step 60 which increments the alternatives pointer to 4. Since MAX=3, the test in step 62 sends execution to step 64. Step 64 increments the sets pointer to 1X1 and sends execution to step 66. Step 66 checks to determine whether the incrementing step 64 was successful, which depends on whether there was a combination of sets available.

Since the 1X1 set combination was available, the sets pointer successfully incremented in step 64, and execution passes to step 30 where the alternatives pointer is initialized to point to the number 2 alternative. Since there are two alternatives (numbers 2 and 3) less than or equal to the current MAX index of 3, steps 32–34, subroutine ENUM, and steps 60–62 are performed twice in the present example. Sequentially two strings, "1one" and "1une," are enumerated and looked up in the dictionary 18. Assuming neither of those strings is found in the dictionary, execution passes to step 64 which increments the sets pointer to 11X. Since the 11X combination has not yet been used, step 66 passes execution to step 32. Steps 32–34, ENUM, and steps 60–62 are performed twice. Sequentially two strings: "10nu" and "10na" are enumerated and looked up in the dictionary 18.

Assuming neither of those strings is found in the dictionary, execution passes to step 64, which attempts to increment the sets pointer. Upon determining in step 66 that there are no more sets combinations to be used, execution passes to step 68. Step 68 increments the counter A which counts the number of non-number 1 alternatives to be included in the strings enumerated. Step 70 determines whether counter A exceeds the number of sets Y. Since counter A is now 2, while Y equals 3, execution returns to step 28.

In step 28 a new sets pointer is initialized. Since counter A is now 2 and there are three sets, the sets pointer is initialized to XX1. Again, X signifies from which set the non-number 1 alternative will be taken. For succeeding enumerations, the sets pointer is incremented to X1X and 1XX in step 64.

In step 30 a new alternatives pointer is initialized. Since counter A is now two and MIN=2, the alternatives pointer is 22. For succeeding enumerations, the alternatives pointer is incremented to 23, 32 and 33 in step 60.

The initial values for the pointers cause enumeration of string "Yone." Repetition of steps 34–38, subroutine ENUM, and steps 60–66 results in the strings "Yune," "7one," "7une," "Y0nu," "Y0na," "70nu," "70na," "1onu," "1ona," "10uu," and "1una" being enumerated in sequential order. In step 68 counter A is incremented again to A=3. Since counter A still does not exceed the number of sets Y, step 70 returns execution to step 28.

In step 28, a new sets pointer is initialized. Since counter A is now 3, the sets pointer is initialized to XXX. In step 30, a new alternatives pointer is initialized to 222. For succeeding enumerations, the alternatives pointer is incremented to 223, 232, 233, 322, 323, 332, and 333 in step 65. Sequentially executing steps 32–34, subroutine ENUM, and 60–62 results in strings "Yonu," "Yona," "Yunu," "Yuna," "7onu," "7ona," "7unu," and "7una." Again, none is found in the dictionary 18.

The result of the comparison in step 70, after incrementing counter A in step 68, is that counter A exceeds the number of sets Y. Execution passes to step 72 where MIN is amended to equal MAX plus 1. In step 74, MAX becomes the new MIN value plus a delta value. In the preferred embodiment, the delta value is 1. As a result, the new MIN is 4 and the new MAX is 5.

Step 76 determines whether there are any alternatives corresponding to the new MIN and MAX. If there were no number 4 alternatives, step 78 would display the preferred string, i.e., the string consisting solely of number 1 alternatives, and step 80 would stop further enumeration. Since there are two sets having a number 4 alternative, enumeration continues with step 26.

In step 26 the counter A is set to 1 again to start enumerating strings with one non-number 1 alternative per string. In step 28 the sets pointer is initialized to the same value that was used the previous time that counter A equaled one, i.e., X11. Using the new values for MIN and counter A the alternatives pointer is initialized to 4 in step 30. The alternatives pointer is initialized to equal MIN. Values less than MIN have already been used in a previous alternatives pointer. With the current pointers, the string enumerated is "t0ne." This is not found in the dictionary 18.

Upon returning to step 60, the alternatives pointer is incremented to 5. Since there is no set with a number 5 alternative, step 62 passes execution to step 64. Step 64 increments the sets pointer to 1X1 and step 66 passes execution to step 30. In step 30, the alternatives pointer is initialized to 4 and a 141 string pattern is obtained in step 32.

Since there is no number 4 alternative in the second set no string is enumerated. An error flag is set so that execution jumps to step 64 which increments the sets pointer to 11X for the next enumeration. The alternatives pointer is initialized to 4 in step 30 and a string pattern of 114 is obtained in step 32. Subroutine ENUM enumerates 10n5, which is not found in the dictionary 18.

After counter A is incremented to 2 in step 68, execution passes to step 28 via step 70. Step 28 initializes the sets pointer to XX1 and step 30 initializes the alternatives pointer to 42. If enumeration were to continue, the alternatives pointer would be enumerated successively to 43, 44, 24 and 34 in step 60. At least one of the values in each alternatives pointer must be greater than or equal to MIN because all combinations consisting of values less than MIN have already been enumerated.

With the current alternative pointer and sets pointer yielding a string pattern of 421, the string enumerated is "tone." Step 52 sends "tone" to the dictionary. Since the string "tone" is found in the dictionary, step 54 in the ENUM subroutine causes execution to branch to step 58. Step 58 displays "tone" on the output device 20, and step 59 stops the enumeration.

In the present example no string was found in the dictionary until "tone" was found which we know to be the word intended by the user. However, if the recognizer 16 had returned an "l" instead of a "Y" in the first set, the string "lone" would have been enumerated before "tone." Since "lone" would have been found in the dictionary, enumeration would have stopped and "lone" would have been displayed instead of "tone," even though it was not the intended word.

In one embodiment, the problem of locating unintended words in the dictionary is overcome by displaying more than one string instead of stopping enumeration after the first string is found in the dictionary. In this embodiment each string found in the dictionary is displayed as it is found, and enumeration continues until the user selects one of the strings displayed. The number of strings displayed equals a preselected wordnumber value, or if fewer exist, the number of strings displayed equals the number of strings produced by exhausting all possible combinations of the alternatives. This embodiment has the advantage of identifying unintended words as they are displayed, but has the disadvantage of requiring the user to pause after each word to select the intended string.

In the preferred embodiment, correction of unintended words occurs only when initiated by the user. The user may wish to rewrite the whole word or simply change one or more symbols. If the user rewrites the entire word, then enumeration proceeds beginning in step 24 of FIG. 2 exactly as if the previous word was never written.

If the user attempts to correct less than an entire word some compensation should be made in order to employ the enumeration scheme shown in FIGS. 2–3. The recognizer 16 returns a set of alternatives for each new symbol written. Looking up in the dictionary strings consisting solely of alternatives for the new symbols would be meaningless. Therefore, the control 12 forms a full word by combining the new sets with the letters of the word that were not changed. All characters between successive instances of end-of-string (EOS) characters are deemed to be part of a single word.

Returning to the present example of the word "tone," suppose the user writes a symbol "b" over the "t" in "tone." The recognizer produces the set {b|d|p}. The control 12 couples the new set with the old letters to produce the symbol graph "{b|d|p}one." That symbol graph is then enumerated according to the scheme depicted in FIGS. 2–3.

Preferably, provision is made to ensure that one of the new strings enumerated is not the same as the word being corrected. One method is to suppress all alternatives that are the same as the letters being corrected. Using the "tone" example, suppose the user writes the symbol "l" over the "t" in "tone." The recognizer produces the set {t|l|ll}. Since it is unlikely that the user intended to correct the "t" with a "t," the control 12 suppresses the "t" alternative to produce the symbol graph {l|ll}one. That symbol graph is enumerated according to the scheme shown in FIGS. 2–3.

Preferably, limits are imposed to reduce the number of strings enumerated. For example, placing a limit on MAX to a reasonable number will limit the number of alternatives from each set that can be used in a string. Preferably, a maximum number of strings is set to a desired string number value, such as 100. If none of the first 100 strings are found in the dictionary 18, then the preferred string consisting of solely the most probably number 1 alternatives is displayed.

Limiting the number of strings is accomplished by including a string count routine between steps 54 and 56 of FIG. 3. A string counter is incremented after each string is enumerated and a check is made to determine when the string counter equals 100. When it does, the preferred string is obtained from a memory block in the control 12 and is displayed on the output device 20 without returning according to step 56.

In the preferred embodiment, a string is looked up in the dictionary immediately after it is enumerated. In an alternate embodiment, a small number of strings is enumerated before looking up a string in the dictionary. This is accomplished by counting each string and testing whether enough strings have been enumerated before outputting a string to the dictionary in step 52 shown in FIG. 3.

It will be appreciated that, although specific embodiments of the invention have been described herein for purposes of illustration, various modifications may be made without departing from the spirit and scope of the invention. Accordingly, the invention is not limited except as by the appended claims.

We claim:

1. A method of recognizing words from handwritten characters using a computer dictionary and a computer recognizer, the recognizer producing a set of one or more alternatives for each character in a handwritten word, with at least one set having plural alternatives, each alternative having a probability of corresponding to the character ranging from a highest probability alternative to a lowest probability alternative, comprising:

looking up in the computer dictionary a sequence of strings, each string having one alternative from each set and being looked up as a unit, the sequence being in a defined order based on the probabilities of the alternatives, the defined order being such that A varies from Y to 0, where Y is the number of sets produced from the word and A is the number of sets contributing an alternative that is the highest probability alternative of its set;

if the string is found in the dictionary, stopping further looking up if the number of strings found in the dictionary is equal to a preselected wordnumber value; and displaying at least one of the strings found in the dictionary.

2. The method of claim 1 wherein the wordnumber value is selected as one.

3. The method of claim 1, further including selecting a maximum index value M which is less than the greatest number of alternatives of any set in the word, and wherein the looking up step includes looking up all combinations of the M most probable alternatives in each set before looking up any combinations of less probable alternatives.

4. The method of claim 3, further including:

increasing the maximum index value M by 1 or more after all possible strings have been looked up for the previous maximum index value M; and looking up all combinations of the M most probable alternatives in each set before looking up any combinations of less probable alternatives.

5. The method of claim 3 wherein the maximum index value M is selected as 3.

6. The method of claim 1, further including displaying a string including the highest probability alternative for each set if there are no strings found in the dictionary.

7. The method of claim 1 wherein in response to a user writing amending character in order to change less than an entire word of previously recognized characters, the method further including producing a set of one or more alternatives for each amending character using the recognizer, grouping the characters not amended with each set produced for the amending characters, and repeating the looking up step using the grouped unchanged characters and each set for the amending characters.

8. The method of claim 1 wherein in response to a user writing an amending character in order to change a previously recognized character, the method further including producing a set of one or more alternatives for the amending character using the recognizer and excluding from the set any alternative that is identical to the previously recognized character.

9. The method of claim 1, further including establishing a maximum string count and stopping further looking up when the number of strings looked up equals the maximum string count.

10. A method of recognizing words from handwritten characters using a computer dictionary and a computer recognizer, the recognizer producing a set of one or more alternatives for each character in a handwritten word, with at least one set having plural alternatives, each alternative having a probability of corresponding to the character ranging from a highest probability alternative to a lowest probability alternative, comprising:

looking up in the computer dictionary a sequence of strings, each string having one alternative from each set and being looked up as a unit, the looking up proceeding in a defined order based on the probabilities of the alternatives, the defined order being such that strings with high probability alternatives are looked up before strings with low probability alternatives; and if one of the strings is found in the dictionary, outputting the string found in the dictionary.

11. The method of claim 10, further including displaying a string comprising the highest probability alternative for each set of no string is found in the dictionary.

12. The method of claim 10, further including selecting a maximum index value M which is less than the greatest number of alternatives of any set in the world, and wherein the looking up step includes looking up all combinations of the M most probable alternatives in each set before looking up any combinations of less probable alternatives.

13. The method of claim 12, further including:

increasing the maximum index value M by 1 or more alter all possible strings have been looked up for the previous maximum index value M; and looking up all combinations of the M most probable alternatives in each set before looking up any combinations of less probable alternatives.

14. The method of claim 12 wherein the maximum index value M is selected as 3.

15. The method of claim 10, further including establishing a maximum string count and stopping further looking up when the number of strings looked up equals the maximum string count.

16. The method of claim 10 wherein in response to a user writing amending characters in order to change less than an entire word of previously recognized characters, the method further including using the recognizer to produce a set of one or more alternatives for each amending character, grouping the characters not amended with each set produced, and repeating the looking up step using the grouped, unchanged characters and each set for the amending characters.

17. The method of claim 10 wherein in response to a user writing an amending character in order to change a previously recognized character, the method further including producing a set of one or more alternatives for the amending character using the recognizer and excluding from the set an alternative that is identical to the previously recognized character.

18. The method of claim 10 wherein the defined order in which the strings are looked up is such that A varies from Y to 0, where Y is the number of sets produced from the word and A is the number of sets contributing an alternative that is the highest probability alternative of its set.

19. A system for recognizing words from handwritten characters using a computer dictionary and a computer recognizer, the recognizer producing a set of one or more alternatives for each character in a handwritten word, with at least one set having plural alternatives, each alternative having a probability of corresponding to the character ranging from a highest probability alternative to a lowest probability alternative, comprising:

means for looking up in the computer dictionary a sequence of strings, each string having one alternative from each set and being looked up as a unit, the sequence being in a defined order based on the probabilities of the alternatives, the defined order being such that A varies from Y to 0, where Y is the number of sets produced from the word and A is the number of sets contributing an alternative that is the highest probability alternative of its set;

means for stopping further looking up if the number of strings found in the dictionary is equal to a preselected wordnumber value; and means for displaying the strings found in the dictionary.

20. The system of claim 19, further including means for stopping further looking up when the number of strings looked up equals a predetermined maximum string count.

21. The system of claim 19, further including means for displaying a string consisting of the highest probability alternative for each set if there are no strings found in the dictionary.

22. The system of claim 19, further including means for preselecting the word number value as 1.

23. A method of recognizing a handwritten word from handwritten characters using a computer dictionary and a computer recognizer, the characters including an amending character that is written in order to change a previously recognized character, comprising:

producing a set of plural alternatives for the amending character, each alternative having a relative probability ranging from a highest probability to a lowest probability;

forming a sequence of strings in a defined order beginning with a string that includes the alternative with the highest probability, each string including unchanged previously recognized characters and an alternative from the set;

looking up in a computer dictionary one or more of the formed strings as units according to the defined order; and displaying a string found in the dictionary.

24. The method of claim 23, further including excluding from the set an alternative that is identical to the previously recognized character.

25. The method of claim 23 wherein the recognizer assigns relative probabilities to each alternative and the forming strings step includes enumerating a sequence of one or more strings, each string having one alternative from the set, the enumerating proceeding in order such that alternatives having relatively high probability are used before alternatives having relatively low probability.

26. A system for recognizing words from handwritten characters, comprising:

a computer recognizer producing a set of one or more alternatives for each character in a handwritten word, with at least one set having plural alternatives, each alternative having a probability of corresponding to the character ranging from a highest probability alternative to a lowest probability alternative;

a computer dictionary;

means for looking up in a dictionary a sequence of strings, each string having one alternative from each set and being looked up as a unit, the looking up proceeding in a defined order based on the probabilities of the alternatives, the defined order being such that A varies from Y to 0, where Y is the number of sets produced from the word and A is the number of sets contributing an alternative that is the highest probability alternative of its set;

means for stopping further looking up of one of the strings is found in the dictionary; and means for displaying the string found in the dictionary.

27. The system of claim 26, further including means for stopping further looking up when the number of strings looked up equals a predetermined maximum string count.

28. The system of claim 26, further including means for displaying a string consisting of the highest probability alternative for each set if there is no string found in the dictionary.

29. A computer storage medium having executable instructions for controlling a computer to recognize an input word having handwritten characters, the executable instructions including instructions for:

producing a set of one or more alternatives for each character in the input word, with at least one set having plural alternatives, each alternative having a probability of corresponding to the character ranging from a highest probability alternative to a lowest probability alternative;

looking up in a computer dictionary a sequence of strings, each string having one alternative from each set and being looked up as a unit, the the sequence being in a defined order based on the probabilities of the alternatives, the defined order being such that strings with high probability alternatives are looked up before strings with low probability alternatives; and outputting one of the strings if the string being output is found in the dictionary.

30. The computer storage medium of claim 29, further including instructions for selecting a maximum index value M which is less than the greatest number of alternatives of any set in the world, and wherein the looking up instructions include instructions for looking up all combinations of the M most probable alternatives in each set before looking up any combinations of less probable alternatives.

31. The computer storage medium of claim 30, further including:

instructions for increasing the maximum index value M by 1 or more after all possible strings have been enumerated for the previous maximum index value M: and instructions for causing the instructions for looking up and displaying to be executed in view of the increased maximum index value M.

32. The computer storage medium of claim 29, further including instructions for establishing a maximum string count and stopping further looking up when the number of strings looked up equals the maximum string count.

33. The computer storage medium of claim 29, further including instructions that, in response to a user writing amending characters in order to change less than an entire word of previously recognized characters, produce a set of one or more alternatives for each amending character, group the characters not amended with the sets produced for the amending characters, and cause the looking up instructions to be executed using the grouped characters and sets.

34. The computer storage medium of claim 29, further including instructions that, in response to a user writing an amending character in order to change a previously recognized character, produce a set of one or more alternatives for the amending character using the recognizer and exclude from the set an alternative that is identical to the previously recognized character.

\* \* \* \* \*